C. J. CARR.
TOOL SECURING MEANS.
APPLICATION FILED JUNE 1, 1910.
995,055.
Patented June 13, 1911.
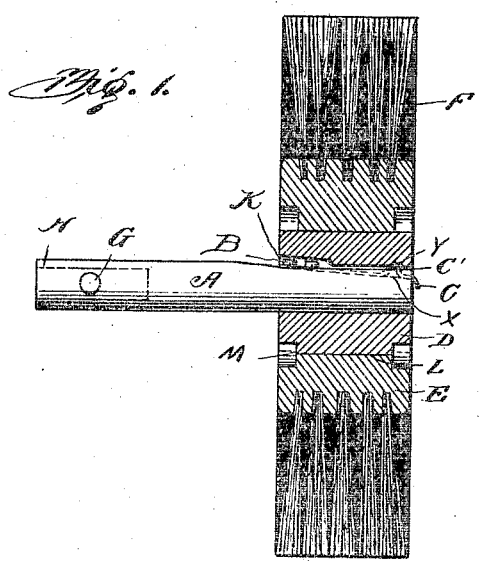
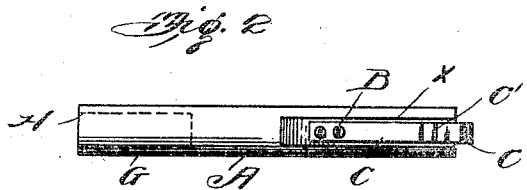
Witnesses
Inventor
Charles J. Carr.
Attorneys

UNITED STATES PATENT OFFICE.

CHARLES J. CARR, OF CLEVELAND, OHIO, ASSIGNOR OF ONE-HALF TO HENRY G. TREMMEL, OF CLEVELAND, OHIO.

TOOL-SECURING MEANS.

995,055.   Specification of Letters Patent.   Patented June 13, 1911.

Application filed June 1, 1910. Serial No. 564,448.

*To all whom it may concern:*

Be it known that I, CHARLES J. CARR, citizen of the United States, residing at Cleveland, in the county of Cuyahoga and State of Ohio, have invented certain new and useful Improvements in Tool-Securing Means, of which the following is a specification.

This invention relates to devices for attaching a wheel to a spindle or shaft, and it is particulary adapted and intended for use in connection with a polishing or buffing wheel, and the construction is such that the wheel may be readily placed on or removed from the spindle.

The invention includes a spring which acts as a key to hold the wheel on the spindle and to insure rotation thereof with the spindle, as will be more fully apparent from the following description and the accompanying drawings.

In the drawings,—Figure 1 is a longitudinal section of the wheel, mounted on the spindle. Fig. 2 is a plan of the spindle. Fig. 3 is an end view of the core or hub of the wheel.

Referring specifically to the drawings, A indicates a spindle or shaft drilled as at H to allow its connection to a drive shaft by means of a set screw in the hole G. The other end of the shaft has an inclined groove X therein, extending lengthwise along the shaft. This receives a spring key C one end of which is fastened to the shaft by screws B or other devices, these fastening devices being located at the shallow or inner end of the groove, so that the heads project beyond the line of the shaft. Near its outer or free end the spring has an inverted V-shaped knuckle or projection C′, the point of which projects outwardly beyond the line of the shaft.

The hub or core D of the wheel, which will preferably be made of metal, has an inclined key-way or groove K which is of greatest depth at the inner end, and which near the outer end has a depression or notch Y of proper shape and in proper position to receive the bend or knuckle C′ of the spring. The width of the key-way K is such that the edges of the spring C, as well as the heads of the screws B, fit closely therein, and said screws, in connection with the spring, form a key to lock the shaft and hub against relative rotation. A wooden core E fits on the hub D, and may be attached thereto in any suitable manner, as by a lug L fitting in a groove M, to insure relative rotation; and at F are indicated bristles projecting from the core E. Obviously buffing, polishing or other material may be mounted on the core, according to the nature of the work to be done, and no limitation in this respect is implied. Neither is the particular construction of the hub and wooden core essential to the invention. The wheel so constructed may be readily placed on the spindle by entering the free end of the spring into the large end of the key-way K, and when the wheel is pressed in the spring will yield until the buckle C′ reaches the notch D, where it will lift to engagement, and by such engagement will prevent the wheel slipping off the end of the spindle; but may be dislodged by smart pull sufficient to compress the spring. The engagement of the screws or other devices B, in the key-way K, as well as the lateral engagement of the spring at the notch D will cause the wheel to rotate with the shaft.

The device provides a simple and effective means of connecting small wheels of any kind to shafts or spindles, and will be found particularly useful under conditions demanding frequent change or substitution of different kinds of wheels on the same shaft, and has the advantage that no tools are required to place or remove the wheels.

Having thus described the invention what I claim as new and desire to secure by Letters Patent is:—

The combination of a spindle having a keyway, a wheel thereon also having a keyway with a notch therein, a spring fastened to the spindle and extending in the key way in the spindle and having a bent portion projecting into said notch, and a fastening device connecting the spring to the spindle and projecting into the keyway in the wheel, said fastening device and spring forming a key between the spindle and wheel.

In testimony whereof, I do affix my signature in presence of two witnesses.

CHARLES J. CARR.

Witnesses:
H. G. TREMMEL,
STEDMAN J. ROCKWELL.